US010053098B2

(12) United States Patent
Feiner et al.

(10) Patent No.: US 10,053,098 B2
(45) Date of Patent: Aug. 21, 2018

(54) DUAL-CLUTCH TRANSMISSION PARKING BRAKE DISENGAGING METHOD OF A VEHICLE

(71) Applicant: ZF Friedrichshafen AG, Friedrichshafen (DE)

(72) Inventors: Andreas Feiner, Isny (DE); Alexander Hoffmann, Lebach (DE); Thomas John, Sulzheim (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/268,573

(22) Filed: Sep. 17, 2016

(65) Prior Publication Data

US 2017/0080943 A1 Mar. 23, 2017

(30) Foreign Application Priority Data

Sep. 18, 2015 (DE) ........................ 10 2015 217 975

(51) Int. Cl.
*B60W 30/18* (2012.01)
*B60T 1/00* (2006.01)
(Continued)

(52) U.S. Cl.
CPC ....... *B60W 30/18054* (2013.01); *B60T 1/005* (2013.01); *B60T 1/062* (2013.01);
(Continued)

(58) Field of Classification Search
CPC ......... B60W 30/18054; B60W 10/196; B60W 10/08; B60W 10/113; B60W 10/02; B60W 10/06; B60W 2710/066; B60W 2710/081; B60W 2510/0275; B60W 2710/188; B60W 2550/142; B60W 2710/1005; B60W 2710/021; B60W 2710/0644;
(Continued)

(56) References Cited

U.S. PATENT DOCUMENTS

| 2012/0191311 A1* | 7/2012 | Mohile | B60T 1/005 701/70 |
| 2014/0257656 A1* | 9/2014 | Schwartz | B60T 7/12 701/61 |
| 2015/0321656 A1* | 11/2015 | Nishikawa | B60K 6/365 192/219.4 |

FOREIGN PATENT DOCUMENTS

DE 102008000177 A1 8/2009

* cited by examiner

*Primary Examiner* — David J Hlavka
(74) *Attorney, Agent, or Firm* — Dority & Manning, P.A.

(57) ABSTRACT

A method for disengaging a parking lock of a dual-clutch transmission of a motor vehicle with at least one drive unit is provided. The method includes, upon detection of an absolute value of a road inclination along a longitudinal axis of the motor vehicle exceeding a predetermined threshold and upon actuation of a selector lever for disengaging the parking lock prior to disengagement of the parking lock, issuing a torque request to the drive unit and closing a power-shifting clutch of the dual-clutch transmission with an engaged gear in a sub-transmission to which the power-shifting clutch is allocated. A torque transferred by the power-shifting clutch as a consequence of closing the power-shifting clutch and the torque request to the drive unit is a relief torque. The torque request to the drive unit and the closed power-shifting clutch are selected to counteract a torque, supported by a parking lock pawl, applying with an engaged parking lock by drive wheels on an output side at the transmission.

5 Claims, 1 Drawing Sheet

(51) Int. Cl.
*B60W 10/02* (2006.01)
*B60W 10/06* (2006.01)
*B60W 10/08* (2006.01)
*B60W 10/113* (2012.01)
*B60W 10/196* (2012.01)
*B60T 1/06* (2006.01)
*F16D 63/00* (2006.01)

(52) U.S. Cl.
CPC ............ *B60W 10/02* (2013.01); *B60W 10/06* (2013.01); *B60W 10/08* (2013.01); *B60W 10/113* (2013.01); *B60W 10/196* (2013.01); *F16D 63/006* (2013.01); *B60T 2210/20* (2013.01); *B60W 2510/0275* (2013.01); *B60W 2550/142* (2013.01); *B60W 2710/021* (2013.01); *B60W 2710/0644* (2013.01); *B60W 2710/0666* (2013.01); *B60W 2710/081* (2013.01); *B60W 2710/083* (2013.01); *B60W 2710/1005* (2013.01); *B60W 2710/188* (2013.01)

(58) Field of Classification Search
CPC .. B60W 2710/083; B60T 1/062; B60T 1/005; B60T 2210/20; F16D 63/006
See application file for complete search history.

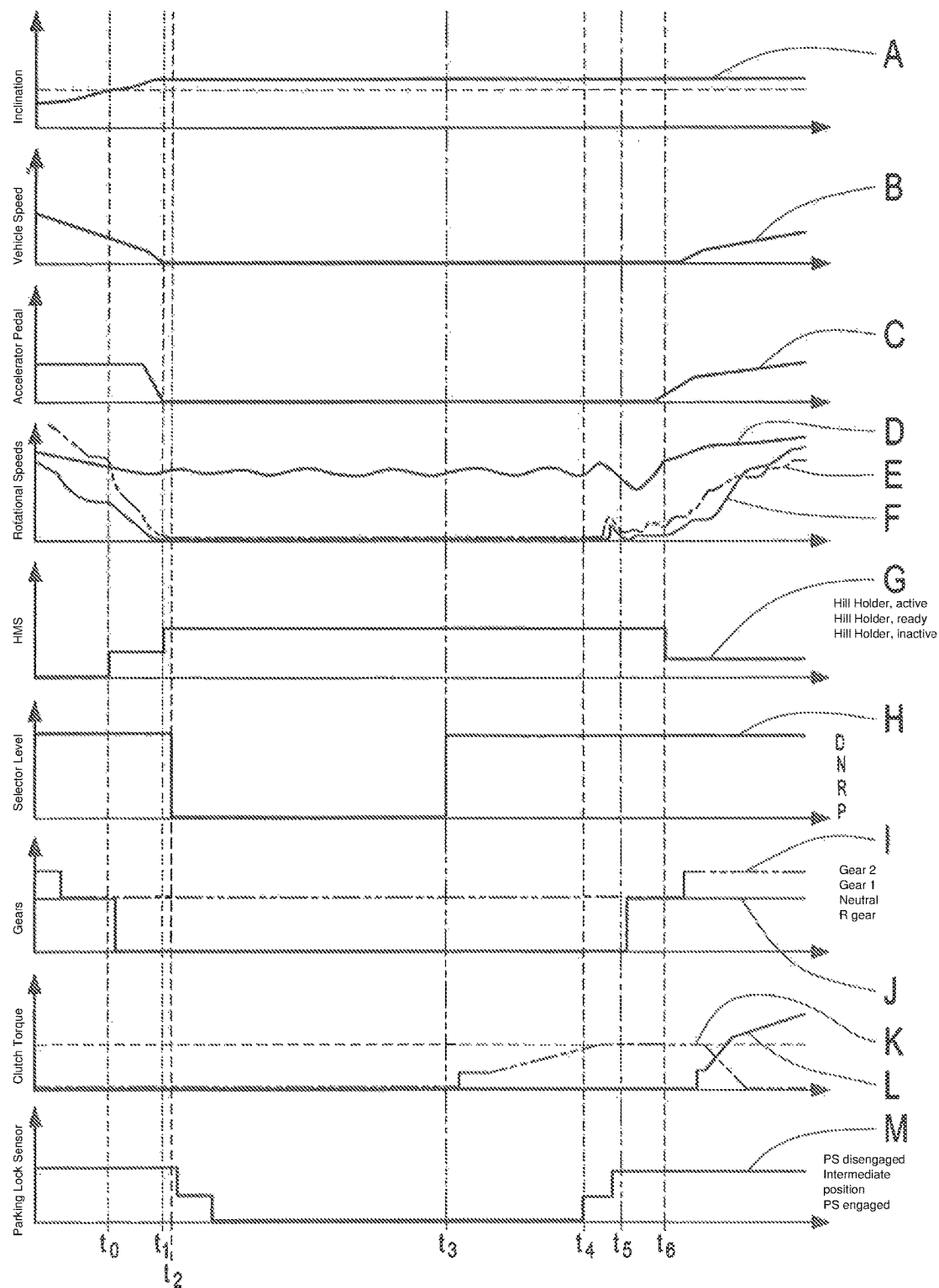

DUAL-CLUTCH TRANSMISSION PARKING BRAKE DISENGAGING METHOD OF A VEHICLE

FIELD OF THE INVENTION

The present invention relates generally to a method for disengaging a parking lock of a dual-clutch transmission of a motor vehicle.

BACKGROUND

Essentially, a dual-clutch transmission has two trains or sub-transmissions, as the case may be, with different pairs of gear wheels, two power-shifting clutches, each of which is allocated to a sub-transmission, one drive shaft and one output shaft, along with, depending on the number of gears, positive-locking, non-synchronized shifting clutches. Thereby, the gears are arranged on an alternating basis in the two sub-transmissions, such that it is possible to pre-select a gear in the load-free sub-transmission, while the torque is transferred from the other sub-transmission. A gear shift is realized by the torque to be transferred being delivered from one power-shifting clutch to the other power-shifting clutch, such that the gears can be shifted without load and without any interruption of the pulling force, and without a tensioning of the shiftable gears. As a rule, with one sub-transmission, the odd gears can be shifted and, with the other sub-transmission, the even gears and the reverse gear can be shifted.

Parking lock mechanisms for automatic transmissions, particularly for dual-clutch transmissions, are known in the state of the art. Typically, such mechanisms feature a pre-loaded spring, through which the parking lock is activated, whereas the parking lock function is realized by a locking pawl/rack system. For deactivating the parking lock, a mechanical gear rod or a hydraulically or pneumatically actuated piston is typically used. In doing so, an actuating rod of a gear rod, or a piston rod of the piston, as the case may be, which for its part is arranged in an axially displaceable manner in a piston bore of the actuator housing, works together with a parking lock pawl and a parking lock gear.

The locking element of such a parking lock mechanism, which is usually formed as a locking pawl, is, in the locked state, typically clamped between a parking lock pawl and a guide plate, in order to prevent the parking lock pawl from being pushed out of the gap in the teeth of a parking interlock gear connected to the output of the transmission.

Upon engaging the parking lock, the parking lock pawl is pressed by the locking pawl into the toothing of the parking interlock gear, and is thereby supported against the guide plate, whereas, with an engaged parking lock, a torque applying at the transmission by the drive wheels on the output side is supported by the ratchet. Such torque may be generated in particular by the fact that the road inclination is great, that is, the vehicle is in the forward direction of uphill or downhill, and the downhill force thereby acting on the vehicle on the output side is introduced into the drive train, by which the drive train is preloaded between the drive wheels and the parking lock.

Upon the disengagement of the parking lock, the locking pawl is displaced in the axial direction, by which the parking lock pawl under tension as a result of the tensioning of the drive train is released as part of a sudden relaxation. During this process, a release jolt disadvantageously occurs, since the parking lock pawl is moved very rapidly in the direction of the locking pawl and the guide plate and, with its end turned away from the parking lock pins, strikes on the guide plate, by which an undesired and loud metallic noise is generated. This sound continues to propagate as a structure-borne sound through the components located in the power flow with the ratchet, up to the transmission housing, and from there is radiated outwards as a sound, which is also perceived as an unpleasant shock.

A device for damping torsional vibrations upon disengaging a parking lock is known from DE 10 2008 000 177 A1 of the applicant, whereas the parking lock features a parking interlock gear connected to the output of the transmission, a ratchet swivel-mounted by a parking lock pin in a transmission housing, which is engaged or disengaged in the parking interlock gear and the swiveling end of which is guided into a guide plate connected to the transmission housing, and a locking element that, in the locked state, is clamped between the ratchet and the guide plate, in order to prevent the pushing out of the ratchet from a gap in the teeth of the parking interlock gear. The known device features a rotatably mounted latch with a latch tooth that is engageable in the toothing of the parking interlock gear, which is connected to an axially acting damping device for tensile and compressive loads, and is arranged in such a manner that, upon the engagement of the parking lock against the force of a return spring, it is pressed in a positive-locking manner into the toothing of the parking interlock gear, whereas, upon the disengagement of the parking lock, a rotational movement of the parking interlock gear of the latch tooth of the latch that meshes in a positive-locking manner in the parking interlock gear is braked or damped, both upon forward and reverse movement, due to the damping effect of the damping device.

SUMMARY OF THE INVENTION

Exemplary aspects of the present invention provide a method for disengaging a parking lock of a dual-clutch transmission of a motor vehicle, through the carrying out of which oscillations of the parking interlock gear and thus the described release jolt are avoided.

Accordingly, a method for disengaging a parking lock of a dual-clutch transmission of a motor vehicle is proposed, within the framework of which, upon the detection of a road inclination along a longitudinal axis of the vehicle, the absolute value of which exceeds a predetermined threshold and, upon the actuation of the selector lever for disengaging the parking lock prior to the disengagement of the parking lock, a torque request is issued and a power-shifting clutch of the dual-clutch transmission with an engaged gear in the sub-transmission, to which the power-shifting clutch is allocated, is closed, whereas the power-shifting clutch to be closed and the requested torque are selected in such a manner that the torque counteracts the torque, supported by the parking lock pawl, applying with an engaged parking lock by the drive wheels on the output side at the transmission, and serves as a relief torque.

As part of an additional exemplary form of the invention, in order to optimize the response time upon the disengagement of the parking lock, the disengagement process is carried out already upon reaching the torque threshold, since the hydraulic system for displacing the locking pawl in the axial direction has a physical dead time.

Accordingly, depending on the road inclination and the drive direction, in the sub-transmission, to which the power-shifting clutch to be closed is allocated, the first gear or the reverse gear is engaged.

Through the concept in accordance with exemplary aspects of the invention, the comfort upon disengaging a parking lock of a dual-clutch transmission of a motor vehicle is increased, whereas, in an advantageous manner, this takes place without additional components or changes to the parking lock mechanism.

BRIEF DESCRIPTION OF THE DRAWINGS

The FIGURE shows chronological progressions of various vehicle and dual-clutch transmission conditions in accordance with an exemplary embodiment of the invention

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In the following, the invention is more specifically described by way of example based on the attached FIGURE, which shows the progressions of the road inclination, the vehicle speed, the accelerator pedal travel, the engine rotational speed, the rotational speed of the input shafts of the sub-transmission of the dual-clutch transmission, the roll-back prevention function (hill holder), the selector lever position, the gears engaged in the sub-transmissions, the clutch torque of the two power-shifting clutches and the signals of the parking lock sensor as a function of time.

In the attached FIGURE, curve A represents the chronological progression of the road inclination, curve B represents the chronological progression of the vehicle speed, curve C represents the chronological progression of the accelerator pedal travel, curve D represents the chronological progression of the engine rotational speed, curve E represents the chronological progression of the rotational speed of the input shaft of the first sub-transmission of the dual-clutch transmission and curve F represents the chronological progression of the input shaft of the second sub-transmission of the dual-clutch transmission. Furthermore, curve G represents the chronological progression of the roll-back prevention function, curve H represents the chronological progression of the selector lever position, curve I represents the chronological progression of the current travel gear, curve J represents the chronological progression of the predicted gear (that is, of the gear that is engaged in the sub-transmission not connected to the drive), curve K represents the chronological progression of the clutch torque of the power-shifting clutch allocated to the second sub-transmission, curve L represents the chronological progression of the clutch torque of the power-shifting clutch allocated to the first sub-transmission, and curve M represents the chronological progression of the signals of the parking lock sensor.

At the point in time t_0, the road inclination exceeds a predetermined threshold, for example five percent (5%), whereas this is detected by a sensor and is transmitted to a controller, whereas, at the same point in time, the roll-back prevention function is transferred from the "inactive" status to the "ready" status. Thereby, with a constant accelerator pedal position and lever position, the vehicle speed, the engine rotational speed and the rotational speeds of the input shafts of the sub-transmission are reduced based on the inclination; the travel gear corresponds to the first gear and is engaged in the second sub-transmission.

At the point in time t_1, with a further declining engine rotational speed, the driver steps off the accelerator pedal, whereas the vehicle is stationary, the roll-back prevention function is transferred from "ready" status to "active" status and the rotational speed of the input shafts of the sub-transmission is zero, whereas, at the point in time t_2, at an inclination that exceeds a predetermined threshold, the selector lever for engaging the position P is actuated and the engagement of the parking lock is requested. The predicted gear, which is engaged in the first sub-transmission, corresponds to the reverse gear at such point in time, whereas, in the second sub-transmission, the first gear is engaged. Due to the dead time of the hydraulic system, for displacing the locking pawl for engaging the parking lock, the parking lock is engaged after the point in time t_2.

At the point in time t_3, the selector lever for engaging the position D is actuated and the disengagement of the parking lock is requested, whereas, in accordance with exemplary aspects of the invention, prior to the disengagement of the parking lock, a torque request is issued and a power-shifting clutch of the dual-clutch transmission with an engaged gear in the sub-transmission, to which the power-shifting clutch is allocated, is closed, whereas the power-shifting clutch to be closed and the torque request to the at least one drive unit are selected in such a manner that a torque transferred by the power-shifting clutch counteracts a torque applied to the transmission on the output side by the drive wheels when the parking lock is engaged, the torque transferred by the power-shifting clutch is supported by the parking lock pawl and serves as a relief torque. In this manner, a damping is achieved. In the present case, the power-shifting clutch allocated to the second sub-transmission, in which the first gear is engaged, is closed, because the vehicle is on an inclination.

In the event that the vehicle is on a gradient, the power-shifting clutch allocated to the first sub-transmission, in which the reverse gear is engaged, is closed to provide a relief torque, whereas the gear is subsequently engaged in accordance with the driver command.

In order to optimize the response time upon the disengagement of the parking lock, already upon reaching a torque threshold, which, in the example shown, amounts to 30 Nm and is achieved at the point in time t_4, the disengagement process of the parking lock is carried out, by which the physical dead time of the hydraulic system is taken into account. The torque is then increased up to a predetermined maximum value. The parking lock is completely disengaged shortly prior to the point in time T_5, whereas, at the point in time T_5, the carrying out of the method in accordance with exemplary aspects of the invention is completed, and, at the subsequent point in time T_6, at which the roll-back prevention function is transferred from "active" status to "ready" status, the vehicle is accelerated as a response to the actuation of the accelerator pedal, the travel gear is the second gear in the first sub-transmission and, as a predicted gear, the first gear remains engaged in the second sub-transmission.

Modifications and variations can be made to the embodiments illustrated or described herein without departing from the scope and spirit of the invention as set forth in the appended claims.

REFERENCE SIGNS

A chronological progression of the road inclination
B chronological progression of the vehicle speed C chronological progression of the accelerator pedal travel
D chronological progression of the engine rotational speed
E chronological progression of the rotational speed of the input shaft of the first sub-transmission
F chronological progression of the rotational speed of the input shaft of the second sub-transmission
G chronological progression of the roll-back prevention function
H chronological progression of the selector lever position
I chronological progression of the travel gear
J chronological progression of the predicted gear
K chronological progression of the clutch torque of the power-shifting clutch allocated to the second sub-transmission
L chronological progression of the clutch torque of the power-shifting clutch allocated to the first sub-transmission
M chronological progression of the signals of the parking lock sensor

The invention claimed is:

1. A method for disengaging a parking lock of a dual-clutch transmission of a motor vehicle with at least one drive unit, the method comprising:
upon detection of an absolute value of a road inclination along a longitudinal axis of the motor vehicle exceeding a predetermined threshold and upon actuation of a selector lever for disengaging the parking lock prior to disengagement of the parking lock, issuing a torque request to the at least one drive unit and closing a power-shifting clutch of the dual-clutch transmission with an engaged gear in a sub-transmission to which the power-shifting clutch is allocated;
wherein a torque transferred by the power-shifting clutch as a consequence of closing the power-shifting clutch and the torque request to the drive unit is a relief torque, and
wherein the torque request to the drive unit and the closed power-shifting clutch are selected to counteract a torque supported by a parking lock pawl, and
wherein the torque supported by the parking lock pawl is applied with an engaged parking lock by drive wheels on an output side at the transmission.

2. The method of claim 1, further comprising disengaging the parking lock upon reaching a torque threshold of the relief torque transferred by the power-shifting clutch in order to account for a physical dead time of a hydraulic system.

3. The method of claim 1, wherein the relief torque is applied by the at least one drive unit at a constant rotational speed of the at least one drive unit.

4. The method of claim 1, wherein the at least one drive unit comprises an internal combustion engine such that the relief torque is applied by the internal combustion engine.

5. The method of claim 1, wherein the at least one drive unit comprises an electric motor such that the relief torque is applied by the electric motor.

* * * * *